US011340946B2

(12) United States Patent
Maldini et al.

(10) Patent No.: US 11,340,946 B2
(45) Date of Patent: May 24, 2022

(54) REACTIVE POOLING

(71) Applicant: Pivotal Software, Inc., San Francisco, CA (US)

(72) Inventors: Stéphane Adrien Joseph Maldini, San Francisco, CA (US); Joseph Benjamin Hale, Corte Madera, CA (US); Simon Baslé, Nantes (FR)

(73) Assignee: Pivotal Software, Inc., Palo Alto, CA (US)

( * ) Notice: Subject to any disclaimer, the term of this patent is extended or adjusted under 35 U.S.C. 154(b) by 574 days.

(21) Appl. No.: 16/377,045

(22) Filed: Apr. 5, 2019

(65) Prior Publication Data
US 2020/0264932 A1    Aug. 20, 2020

Related U.S. Application Data

(60) Provisional application No. 62/805,863, filed on Feb. 14, 2019.

(51) Int. Cl.
*G06F 9/50* (2006.01)
*H04L 67/55* (2022.01)

(52) U.S. Cl.
CPC ............ *G06F 9/5022* (2013.01); *H04L 67/26* (2013.01); *G06F 2209/503* (2013.01); *G06F 2209/5011* (2013.01)

(58) Field of Classification Search
None
See application file for complete search history.

(56) References Cited

U.S. PATENT DOCUMENTS

| 5,819,255 | A | 10/1998 | Celis et al. |
|---|---|---|---|
| 6,606,626 | B1 | 8/2003 | Ponnekanti |
| 7,139,749 | B2 | 11/2006 | Bossman et al. |
| 9,400,638 | B2 * | 7/2016 | De Smet ................... G06F 8/30 |
| 2012/0047495 | A1 * | 2/2012 | Meijer .................... G06F 8/314 |
|  |  |  | 717/140 |

(Continued)

OTHER PUBLICATIONS

Online , "Web Reactive Framework: Part V. The Web," retrieved on Mar. 26, 2019, pp. 5.*

(Continued)

*Primary Examiner* — Isaac Tuku Tecklu
(74) *Attorney, Agent, or Firm* — Fish & Richardson P.C.

(57) ABSTRACT

Methods, systems, and apparatus, including computer programs encoded on computer storage media, for using reactive programming operators to implement resource pooling. One of the methods includes receiving a first request, from a client application, for a poolable object in a resource pool and maintained by a resource pool manager, wherein the request indicates an operation mode specifying how the resource pool manager should release the poolable object back into the resource pool; generating a plurality of reactive programming operators comprising a poolable object listener publisher and a subscriber that is configured to subscribe to the poolable object listener publisher; evaluating the reactive programming operators in an upstream subscription ordering of the reactive programming operators to obtain a poolable object from the resource pool; and releasing the poolable object back to the resource pool according to the operation mode of the request.

20 Claims, 7 Drawing Sheets

(56) References Cited

U.S. PATENT DOCUMENTS

| | | | | |
|---|---|---|---|---|
| 2012/0084749 A1* | 4/2012 | Gogh | ................ | G06F 8/30 |
| | | | | 717/106 |
| 2013/0117736 A1* | 5/2013 | De Smet | ................ | G06F 40/18 |
| | | | | 717/153 |
| 2014/0025630 A1* | 1/2014 | Takase | ................ | H04L 67/1097 |
| | | | | 707/609 |

OTHER PUBLICATIONS

U.S. Appl. No. 62/682,629, Hale et al., filed Jun. 8, 2018.

Brettwoolridge [online], "HikariCP • A solid, high-performance, JDBC connection pool at last," Github.com, available on or before Nov. 11, 2018, via Internet Archive: Wayback Machine URL <https://web.archive.org/web/20181029152655/https://brettwooldridge.github.io/HikariCP/>, retrieved on Oct. 7, 2019, URL<https://brettwoolridge.github.io/HikariCP/>, 2 pages.

Chrisvest [online], "Stormpot: A fast object pool for the JVM," Github.com, available on or before Jun. 11, 2018, via Internet Archive: Wayback Machine URL <https://web.archive.org/web/20180611020237/https://github.com/chrisvest/stormpot/?, retireved on Oct. 7, 2019, URL <https://github.com/chrisvest/stormpot/>, 3 pages.

Docs.Microsoft.com [online], "SQL Server Connection Pooling (ADO.NET)," Retrieving and Modifying Data in ADO.NET: Connection Pooling, Mar. 29, 2017, 7 pages.

Docs.spring.io [online] "23. Web Reactive Framework: Part V. The Web," retrieved on Mar. 26, 2019, retrieved from: https://docs.spring.io/spring-framework/docs/5.0.0.M1/spring-framework-reference/html/web-reactive.html, 5 pages.

Github.com [online] "High performance reactive Postgres Client written in Java," year 2019, [retrieved on Mar. 26, 2019], retrieved from: https://github.com/reactiverse/reactive-pg-client, 7 pages.

Jdbi.org [online] Jdbi 3 Developer Guide, dated Jan. 22, 2019 [retrieved on Mar. 26, 2019], retrieved from: http://jdbi.org/, 126 pages.

Maldini, "Reactor Netty," Asynchronous TCP, UDP and HTTP, dated Mar. 26, 2019, 9 pages.

Postgresql.org [online] Chapter 51. Frontend/Backend Protocol, dated Feb. 14, 2019 [retrieved on Mar. 26, 2019], retrieved from: https://www.postgresql.org/docs/9.6/protocol.html, 2 pages.

Projectreactor.io [online] Reactor Core 3.2.8.Release, retrieved on Mar. 26, 2019, retrieved from: https://projectreactor.io/docs/core/release/api/, 2 pages.

R2dbc.io [online] R2DBC: Clients, year 2018, [retrieved on Mar. 26, 2019], retrieved from: https://r2dbc.io/clients/, 4 pages.

* cited by examiner

REACTIVE POOLING

CROSS-REFERENCE TO RELATED APPLICATION

This application claims priority to U.S. Provisional Application No. 62/805,863, filed on Feb. 14, 2019. The disclosure of the prior application is considered part of and is incorporated by reference in the disclosure of this application.

BACKGROUND

This specification relates to resource pooling.

A resource pool is a group of objects that are used to control and regulate access to a finite number of corresponding computing resources. Resource pools are commonly used to control access to resources that are both expensive to create and that can be relatively cheaply reused. For example, a resource pool can be used to control access to database connections, arrays in memory, and backend servers, to name just a few examples.

For example, a system communicating with a database can implement a database connection pool because it is computationally expensive to repeatedly open and close a database connection. Instead, the system can maintain a database connection pool having one or more open database connections that are much cheaper to reuse than to newly create. When the system receives a query, the system can check for an available database connection in the database connection pool. If a database connection in the pool is available, the system can use the available database connection to execute the query to the database.

A database connection pool can also be used to implement rate limiting. Rate limiting controls the rate in which client applications communicate with a database. For example, the database connection pool can be populated with one or more tokens. When a client application wants to communicate with a server for the database, the system implementing the database connection pool checks to see if a token is available in the pool. If a token is available, the client application is assigned the token and proceeds to establish a connection with the database. If no tokens are available, the client application must wait for an available token.

In general, rate-limiting can be applied to a resource pool of data slated for processing by one or more processing nodes on a network, where subsets of the data are sent to the processing nodes, on request, in a controlled manner.

Systems implementing resource pools often manage a large number, e.g., 10,000, of requests from client applications for limited resources. Because there are typically far fewer resources in the pool relative to the number of requests for a database connection, the software of a requesting client application may block for an unbounded amount of time to wait for an available resource in the pool.

During these blocking operations, the application occupies at least one thread of the underlying computing environment while doing no actual work. A common thread utilization strategy on multicore processors is to dedicate one core to each thread. Therefore, when one thread is blocking, the utilization of the processor is hindered, making the number of threads supported by the computing environment a bottleneck that limits computing resources that can otherwise be utilized to perform other tasks while waiting for an available resource in the pool.

SUMMARY

This specification describes using reactive programming operators to implement resource pooling using a reactive resource pooling system.

Particular embodiments of the subject matter described in this specification can be implemented so as to realize one or more of the following advantages.

Client applications can be implemented to request poolable objects assigned to finite resources managed by the reactive resource pooling system, e.g., a database connection or a subset of data slated for processing. The poolable objects can be obtained from the reactive resource pooling system maintaining a resource pool in a non-blocking, reactive push/pull model, consistent with a reactive programming paradigm. Additionally, rate-limiting for a server receiving multiple requests for data concurrently also benefits from the non-blocking, reactive push/pull model of resource pooling of the disclosed subject matter.

Computing resources allocated to threads can be aggressively relinquished to prevent idle computing resources, because the reactive resource pooling system relinquishes resources without blocking before receiving an indication that a resource in the pool is available. Relinquished computing resources can then be allocated to perform other tasks, while waiting for an available resource in the pool. The reactive resource pooling system can allocate a thread in response to an indication that a resource connection is available.

The reactive resource pooling system includes different operation modes for obtaining resource connections. Multiple operation modes allows for flexible implementations of reactive pooling for client applications.

In the borrow operation mode, the reactive resource pooling system handles requesting and obtaining a resource from a pool of resources in a manner transparent to the client application initiating the request.

In the acquire operation mode, the reactive resource pooling system allows the client application to specify conditions for obtaining a resource from the pool of resources. A client application can determine whether a system-dictated process for obtaining a resource is sufficient, or if the particular client application requires customization for reasons related to performance or restraints imposed by the particular client application.

For reactive programming applications allocating threads representing computing resources for one or more computer processing cores, the non-blocking nature of the reactive resource pooling system means that the system can run the cores at full utilization. The reactive resource pooling system can also manage a large number of requests for a resource in the pool concurrently, while not blocking a thread until a connection is available.

Additionally, the reactive resource pooling system can handle a large number of concurrent threads, e.g., 65536 threads, without requiring the client application to make substantive decisions about how the threads are allocated.

Additionally, the reactive resource pooling system can control the rate in which requested data, such as a subset of data to be processed by a client application, is received by the client application. Depending on the current capability of the client application, transmission of data by the system to the client application can be increased or decreased, minimizing backlog of data caused by providing a client application more data than it can presently process, and allowing the system to more effectively deploy computing resources elsewhere.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
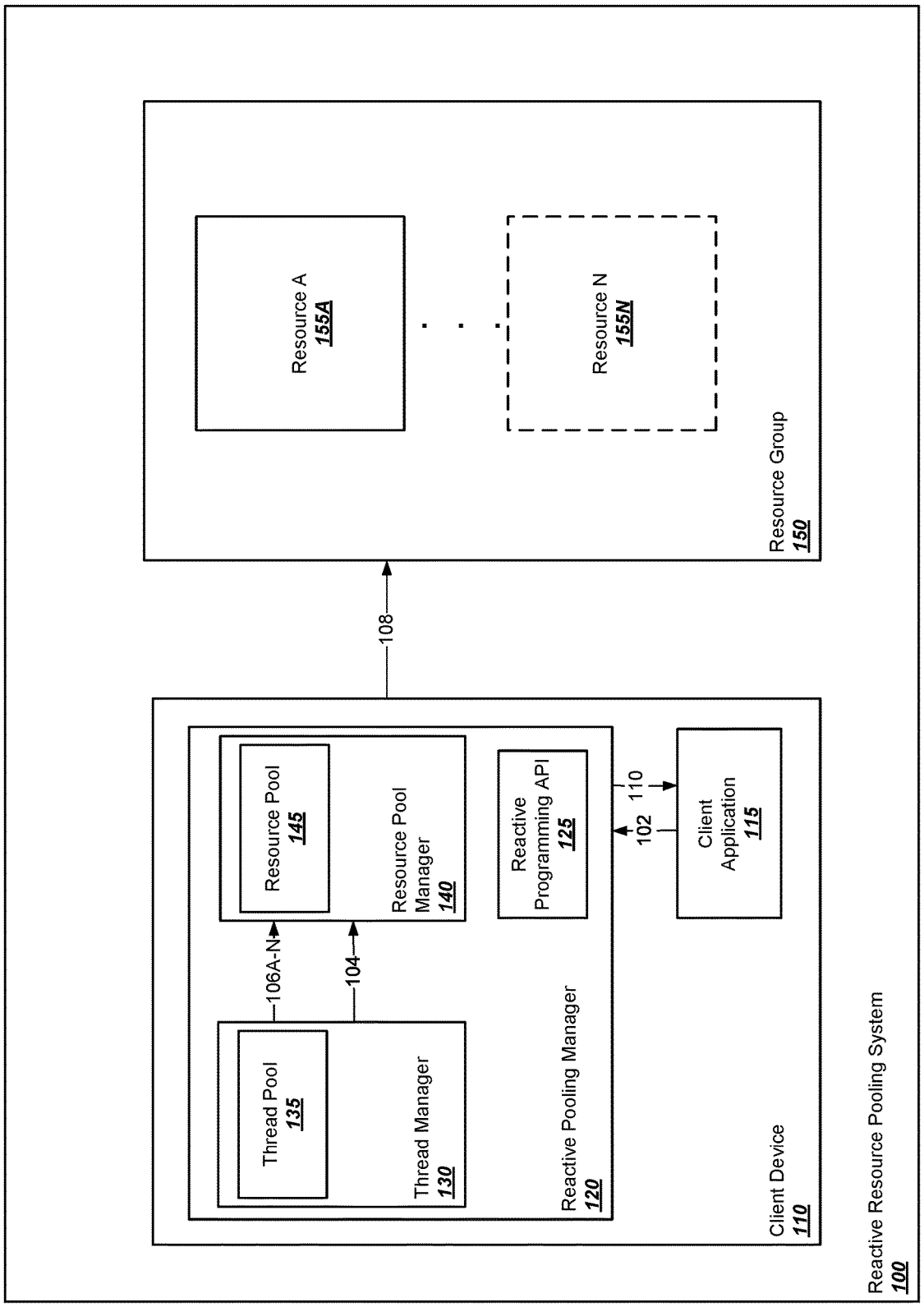
FIG. 1 is a diagram of a reactive resource pooling system that illustrates a client device communicating with a resource group.

This specification describes techniques for managing a resource pool using reactive programming operators. To do so, a reactive resource pooling system can manage a plurality of threads for providing access to resources maintained by the resource pool.

In this specification, a poolable object refers to an object in a resource pool. A poolable object can be assigned to a particular resource that is finite in the system. The system can control access to the finite resources by using poolable objects in the resource pool in response to requests from client applications. For brevity, the allocation of a client request to a poolable object that corresponds to a computing resource can be referred to as a resource connection, e.g., a connection to a database or any repository storing data. The reactive pooling resource system may allow only a limited number of resource connections to a resource, for example to prevent overloading a resource manager for the resource with requests from the client applications.

The techniques described in this specification can also be used for other applications of pooling. For example, poolable objects in a resource pool can be used to represent respective subsets of a large dataset slated for processing by the reactive resource pooling system. For example, the reactive resource pooling system could manage a pool of poolable objects to represent reusable byte buffers storing data. Client applications can request the next available byte buffer to process the data stored in the byte buffer, and the reactive resource pooling system can facilitate parallel processing of a large set of data by maintaining a pool representing all the data to be processed.

The reactive resource pooling system is implemented using reactive programming. Reactive programming is an asynchronous programming paradigm focused on data streams and the propagation of change. Therefore, in a reactive programming language it is possible to express static, e.g., arrays, or dynamic, e.g., event emitters, data streams by simply declaring variables having appropriate types. A reactive programming program can include one or more subscription operators, that when executed, subscribe to a respective one or more publisher operators. Upon subscription, the one or more publisher operators begin to emit data for use in the reactive programming program.

A primary advantage of reactive programming paradigms is that the code is asynchronous and non-blocking. A single thread can be used to process multiple asynchronous sequences that execute at roughly the same time, meaning that execution often jumps from one thread to another. In other words, rather than blocking on a particular operation, the execution is allowed to switch to another active task using the same underlying resources and later come back to the previous process when the asynchronous processing has completed.

In a reactive programming paradigm, thread boundaries are no longer obeyed. In a blocking programming paradigm, each thread can store its own copy of a local variable. For example, in Java, threads can make use of ThreadLocal variables to store local copies of data.

In contrast, in a reactive programming system, the thread is not owned by the program currently being executed, and thus the thread can be switched to execute operators of other program instances at any time. Therefore, thread boundaries no longer provide stability for storing information locally, in association with a single thread.

To achieve this, subscription contexts are implemented to store information that would otherwise be local to a respective thread. Subscription contexts are data structures that store one or more data values in association with a particular subscriber and a particular operator of a client application. In some implementations, a subscription context is implemented as a mapping between keys and values, e.g., as a dictionary, a hash map, or an associative array, to name just a few examples. A full discussion of subscription contexts is provided in U.S. Application No. 62/682,629 ("REACTIVE PROGRAMMING SUBSCRIPTION CONTEXT"), filed on Jun. 8, 2018, which is incorporated herein by reference in its entirety.

In a reactive programming system, each program defines an ordering of one or more operators, which the system can iterate over twice in opposite directions. An upstream ordering of the operators from a subscriber to a publisher represents a subscription flow through the operators for a particular subscriber. A downstream ordering of operators represents a data flow through the operators that propagates data from a particular publisher to a particular subscriber. The operators are executed during the downstream data flow through the operators, as data is propagated.

A reactive programming system generally executes the upstream subscription flow first, followed by the downstream data flow. Subscription contexts can be written during the upstream subscription flow. During the downstream data flow, each downstream operator can request the current values of the subscription context from a downstream operator.

The values written to the subscription context are only available for upstream operators. In addition, in some implementations, the subscription contexts cannot be mutated during the downstream data flow.

Importantly, the semantics of a reactive program imply non-blocking operation between operators in the ordering. In other words, operations of adjacent operators in the ordering can be, and indeed are expected to be, handled by different threads in the underlying execution system. The threads that implement the operators generally do not maintain any state between the operators.

As another important feature, reactive programs facilitate handling backpressure caused by publishers emitting more data than subscribers can consume. For example, instead of a subscriber operator filling an ever-expanding buffer of data emitted by a publisher the subscriber is subscribed to, a reactive programming system can generally manage how much data is emitted from a publisher at once. The publisher can emit data as fast as a subscriber can consume, e.g., process, the data. Instead of filling a buffer for data waiting to be processed, the system can release computing resources instead of blocking while waiting to emit more data. Alternatively, the subscriber can dictate how fast the publisher upstream emits data, pausing and resuming data emission according to how the subscriber's processing capability.

FIG. 1 is a diagram of a reactive resource pooling system 100 that illustrates a client device 110 communicating with a resource group 150. Although illustrated as a separate system in FIG. 1, the resource group 150 can also be installed on the client device 110.

The resource group 150 can include one or more resources 155A-N. As described above, a resource can be a source of data that can be read or written to by a client application 115 on the client device 110. For example, resource A 155A can be a relational database, a messaging system that stores messages, a network interface for the client device 110, or a database storing data to be processed by multiple client applications on multiple devices, including the client application 115 on the client device 115.

The reactive resource pooling system 100 can be part of a parallel processing system, processing data stored in the one or more resources 155A-N. The resource group 150 can store subsets of data to be processed by the client applications as client applications become available for additional processing. After a client application processes a subset of data, the client application can send a request for more data, and a reactive pooling manager 120 can receive the request and provide an available resource connection to a resource, through the respective resource manager for the resource.

As a result of the design of the reactive resource pooling system 100 under a reactive programming paradigm, the reactive resource pooling system 100 can obtain a request from the client application 115 for a resource connection and provide an available resource connection in a manner that is (1) non-blocking and (2) resilient to backpressure.

The reactive resource pooling system 100 can provide an available resource connection in a non-blocking way. If a requested resource connection is not available, the reactive resource pooling system 100 can reassign a thread that makes the request. For example, the thread can be reassigned to perform unrelated non-blocking processing until a resource connection becomes available. This reduces the instances of threads being blocked without doing any useful work.

As part of the reactive resource pooling system 100, the reactive pooling manager 120 can receive requests to connect to the one or more resources 155A-N. A particular resource in the resource group 150 can be accessed through an open connection to that particular resource. Because generating a new resource connection is computationally expensive, it is preferable to re-use existing connections to a particular resource to execute subsequent operations to read or write to data at that particular resource.

The reactive resource pooling system 100 can manage a resource pool of resource connections to the one or more resources. Because of the reactive programming techniques discussed below, the reactive pooling manager 120 can queue multiple requests for a finite number of resource connections without binding a thread to monitor the resource pool for the next available connection. Under conventional resource connection pooling systems, a bound thread risks remaining idle while waiting for a resource connection to become available in the resource pool.

The reactive pooling manager 120 can operate to provide resources to a requesting client application under a variety of circumstances. In some implementations, the reactive pooling manager 120 can manage the resource group 150 as a source of reusable byte buffers storing data for one or more client applications to process. As resource connections become available, the system can fulfill queued requests for a connection to the resource, so that the client application can download data from the next byte buffer slated for processing.

The reactive pooling manager 120 can also manage access to a persistent resource connection to the resource group 150. In some implementations, rather than establish and later close connections to a resource in the resource group 150 as incoming requests are received, the reactive pooling manager 120 can manage a pool of tokens as poolable objects, requiring client applications to obtain a token to use the connection. For example, through a finite available number of tokens, the reactive pooling manager 120 can limit concurrent access to the resource group 150 through the persistent connection.

As another example, a poolable object can represent a segment of available memory or another computing resource, such as an allotment of time to access a processor.

The client device 110 can have installed the reactive pooling manager 120 and the client application 115. The reactive pooling manager 120 can receive requests from the client application 115 to interact with the resources 155A-N. The reactive pooling manager 120 can include a reactive programming application program interface ("API") 125, a resource pool manager 140, and a thread manager 130.

The client application 115 can dictate how the reactive pooling manager 120 handles a request and provides a requested resource connection by designating one of two operation modes: either an acquire operation mode, or a borrow operation mode. The client application 115 has the flexibility to expand or limit the control it has over the reactive pooling manager 120 as its request for a resource in the resource group is fulfilled.

During the borrow operation mode, the client application 115 can leave lifecycle responsibilities to the reactive pooling manager 120. In this specification, resource connections obtained during the borrow operation mode may be referred to as borrowed resource connections.

During the acquire operation mode, the client application 115 can take on responsibility for the lifecycle of the pooled resource connection. In this specification, resource connections obtained during the acquire operation mode may be referred to as acquired resource connections. The client application 115 gets more information about the resource connection provided by the reactive pooling manager 120 in response to a request, and the client application 115 becomes responsible for releasing the resource when the client application 115 finishes executing operations on the resource group 150.

More specifically, the client application 115 can specify an operation mode, changing the process for the reactive pooling manager 120 to obtain a resource connection. In the borrow operation mode, the client application 115 can declaratively provide a reactive programming pipeline that will make use of the resource. It is then the resource pool manager 140 that is responsible for releasing the resource connection back into the resource pool 145 when the client application 115 is finished executing operations on the resource through the reactive programming pipeline.

In some situations it may be advantageous to specify the acquire operation mode. For example, if the client application 115 is known to operate only on a particular resource, then it may be more efficient in some instances to request an available resource connection for the particular resource, and persist the connection until the operations for the client application 115 have finished executing.

In the acquire operation mode, the resource pool manager 140 can provide the client application 115 with metadata about the requested resource connection. The client application 115 can, using the metadata, choose to invalidate a resource connection. In this specification, invalidating a resource connection means to remove the resource connection from the resource pool 145 so that the resource connection cannot be later used to satisfy subsequent requests. The client application 115 can choose to invalidate a resource connection, based on conditions chose by the client application 115 that are specific to how the client application 115 uses the requested resource.

For example and as will be discussed in more detail, below metadata can include statistics about the resource connection, such as the age or the resource connection, e.g., how long the resource connection has been in the resource pool 145. In either the borrow or acquire operation mode, the resource pool manager 140 can be configured to automatically invalidate resource connections that exceed a predetermined age threshold. In the acquire operation mode, the client application 115 has access information about the particular resource connection through the metadata, and can optionally set conditions on a per-resource connection basis. In some implementations, the client application 115 in the acquire operation mode can enforce different age thresholds for different resource connections, depending on the requirements of the client application 115.

When a resource connection is released back to the resource pool 145, the reactive resource pool manager 140 can select the next request and serve it with the released resource connection. In some implementations, before releasing the resource connection back to the resource pool 145, the resource pool manager 140 can determine if the resource connection meets any conditions for invalidation. If the resource pool manager 140 does determine that the resource connection meets conditions for invalidation, the resource pool manager 140 can invalidate the resource connection instead of releasing the resource connection back into the resource pool 145.

If a resource connection is invalidated, the resource pool manager 140 may re-populate the resource pool 145 with a replacement resource connection. In some implementations, the resource pool manager 140 can be further configured to monitor the resource pool 145 to determine if a minimum number of resource connections are available to satisfy incoming requests from client applications.

After invalidating a resource connection, the resource pool manager 140 can generate a new, replacement, resource connection. The resource pool manager 140 can then provide the newly generated resource connection to the next queued request. If there is no currently queued request for the newly generated resource connection, the resource pool manager 140 can release the resource connection into the resource pool 145.

Because the reactive pooling manager 120 is implemented in a reactive programming paradigm, requested operations that are waiting to receive a resource connection from the resource pool manager 140 do not block computing resources, e.g., threads. Instead, the resource pool manager 140 can, in response to determining that a resource connection satisfying the next request in the queue is unavailable, relinquish computing resources associated with a resource connection listener operator configured to check the resource pool 145 for an available resource connection.

Then, the reactive pooling manager 120 through a thread manager 130 can allocate computing resources to execute another resource connection listener operator, that when executed, is configured to check the availability of a resource connection in the resource pool 145 matching the request for the next request in the queue.

Because the reactive pooling manager 120 manages only borrowed resource connections and not acquired resource connections, the client application 115 is also responsible for releasing the acquired resource connection. In some implementations, the reactive pooling manager 120 can raise an exception if the client application does not release the resource connection back into the resource pool in a timely fashion, e.g., according to a predetermined time limit or before scheduled garbage collection begins.

The reactive pooling manager 120, either by direction from the client application or by predetermined configuration options imposed by the system, can also handle exceptions raised when a requested resource connection is not available. For example, the client application 115 can impose a time limit for satisfying a request for a resource connection, and the reactive pooling manager 120 can raise an exception if the requested resource connection is not provided to the client application 115 by the time limit. Alternatively or in addition, the reactive pooling manager 120 can impose its own time limit for providing resource connections in response to a request from a client application, and raise an exception if the request is not met by the time limit.

If the client application 115 specifies the acquire operation mode then the client application 115 may not indicate what operations will be executed on the requested resource, and only request a resource connection. Because the client application 115 specified the acquire operation mode, the client application 115 can decide when to return the resource connection, allowing the client application 115 to persist the connection for a period of time and execute multiple operations over that period of time.

This is in contrast to the borrow operation mode, in which the client application 115 sends a request for a resource connection and the requested operations to execute, e.g., the requested operations 102. When the reactive pooling manager 120 receives an indication that the requested resource connection is available in the resource pool 145, the reactive pooling manager 120 can proceed to also execute the requested operations 102, as discussed in detail, below. Then, any results 110 from executing the requested operations 102 are sent to the client application 115, and the requested resource connection is returned to the resource pool 145.

The reactive programming API 125 can also define operations for the client application 115 to use in specifying the acquire operation mode or borrow operation mode for fulfilling a request for a resource connection. The resource pool manager 140, in general, can receive the requested operations 102 from the client application 115, and once resource connections for requested resources in the resources 155A-N are available in the resource pool 145, the resource pool manager 140 can execute the requested operations 102 on a provided resource connection.

The client application 115 can request a resource connection that does not currently exist. This may occur, for example, if this is the first time the resource pool manager 140 receives a request for a resource connection for a particular resource. In response, the resource pool manager 140 can generate a new resource connection for the requested resource, and add it to the resource pool 145. The resource pool manager 140 can use the newly created resource connection to satisfy the request that prompted the generation of the resource connection in the first place.

The client application 115 can also request a resource connection that exists in the resource pool 145, but is not currently available, e.g., because the resource connection is currently being used to satisfy another request. As discussed below, the resource pool manager 140 can monitor the resource pool 145 and determine if a resource connection is available. The resource pool manager 140 can also manage a queue of requested operations waiting for an available resource connection to a respective resource, and assign the resource connection for the next set of requested operations in the queue. The resource pool manager 140 at any given time may have more than one available resource connection for a particular resource in the resource group 150. The resource pool manager 140 can select one of the resource connections, e.g., at random, in response to the requested operations 102.

The thread manager 130 can manage the thread pool 135 of available computing resources and can allocate computing resources to, for example: check the resource pool 145 for an available resource connection, establish a connection to a resource using an available resource connection, and execute the requested operations 102. Allocating computing resources to a particular thread refers to designating some or all of a computing resource available to the system, e.g., one or more processors, processor cores, co-processors, or special-purpose processors, for the exclusive use of executing the operator for the particular thread. Relinquishing the computing resources for a thread refers to making computing resources that were previously allocated by the thread available again for use by the system. For example, if the system allocated a processor core to a first thread, then that processor core is not available to the system until the processor is subsequently relinquished. Once the processor core is relinquished, the processor core can be used, for example, in allocating computing resources for a second thread.

The system 100 will be described by an example of the client application 115 sending requests to execute operations 102 on a resource A 155A in the resource group 150.

The reactive pooling manager 120 can receive the requested operations 102 from the client application 115. The resource pool manager 140, in response to the reactive pooling manager 120 receiving the requested operations 102, can generate a plurality of reactive programming publishers using the reactive programming API 125. Reactive programming publishers, when executed, are configured to perform one of several tasks. These tasks are associated with checking the resource pool 145 for an available resource connection, establishing a resource connection, and executing the requested operations 102.

A subscriber for a client application defines the client application as the ultimate recipient of data emitted by a publisher. When the client application subscribes to a publisher, e.g., a publisher described above, the publisher can emit data that passes in the downward data flow of an ordering defined by the respective publisher and the subscriber of the client application. In addition, in the borrow operation mode, the client application can generate and apply reactive programming operators to execute the requested operations.

For example, one reactive programming publisher is a resource connection listener publisher that when executed, is configured to listen for an available resource connection in the resource pool 145. The resource connection listener publisher when subscribed to, begins to emit data. The data emitted from the resource connection listener publisher can be an indication that a resource connection for a particular resource, e.g., the resource 155A, is available. The indication is passed to the next reactive programming operator in the downstream flow, and may flow all the way to the subscriber for the client application 115 that is subscribed to the resource connection listener publisher.

One example of a reactive programming publisher is an acquire publisher. The resource pool manager 140 can generate an acquire publisher that when subscribed to is configured to acquire a resource connection in the resource pool 145. The acquire publisher can be generated in response to a request from the client application 115 in the acquire operation mode and can represent a lazy reference to the resource connection. The acquire publisher is described as a lazy reference because it is not known at the time that the acquire publisher is generated whether a resource connection is actually available in the resource pool 145. If a resource connection is available the acquire publisher can emit the resource connection. If a resource connection is not available the acquire publisher can emit an indication that a resource connection is not currently available.

Another example of a reactive programming publisher is a release publisher. The resource pool manager 140 can generate a release publisher in response to a request from the client application 115 in the acquire operation mode, corresponding to an acquire publisher. Because the client application 115 is responsible for managing the acquired resource connection, when the client application 115 is finished using the resource connection, the client application 115 can subscribe to the release publisher to release the resource connection.

As discussed below, with reference to FIGS. 4A-C, one or more of these reactive programming operators can be arranged in a defined reactive programming ordering, between a publisher and the subscriber for the client application 115. Depending on the operation mode, either the client application 115 or the resource pool manager 140 can apply reactive programming operators to use the resource connection, e.g., execute operations on the resource for the resource connection.

In the borrow operation mode, the client application 115 must provide the reactive pooling manager 120 a processing pipeline of reactive programming operators that when executed are configured to execute the requested operations 102. When the processing pipeline has completed, the resource pool manager 140 can manage releasing the resource connection, which can also include invalidating the resource connection and generating a new resource connection, as discussed above. In the acquire operation mode, the client application 115 does not provide the reactive pooling manager 120 with a processing pipeline of reactive programming operators.

The resource pool manager 140 can evaluate the reactive programming operators in the upstream subscription flow ordering until evaluating a resource connection listener publisher. In response, the thread manager 130 can allocate a first thread 104 from the thread pool 135 to execute the resource connection listener publisher. A detailed description of the upstream subscription flow and downstream data flow for an ordering of reactive programming operators is discussed, below.

The resource pool manager 140 can use the resource connection listener publisher to emit an indication when a resource connection is available. However, before the resource pool manager 140 receives an indication that a resource connection is available, the thread manager 130 can relinquish computing resources associated with the first thread 104 allocated to execute the resource connection listener publisher.

The resource connection listener publisher can be configured to perform an initial check that a resource connection is available for a particular resource. In some implementations, if the resource pool manager 140 receives an indication from this initial check, the resource pool manager 140 can use the first thread to establish a connection with the particular resource.

After the resource pool manager 140 is operating in the borrow operation mode and receives an indication that a resource connection is available in the resource pool 145, the thread manager 130 can allocate a plurality of threads 106A-N to execute the requested operations on the resource connection.

Requested operations from a client application can include operations interacting on different resources. As a result, in some implementations, the client application 115 can provide multiple processing pipelines corresponding to different resources, when the client application 115 specifies the borrow operation mode. In some implementations, the client application 115 can specify the acquire operation mode, but request multiple resource connections to different resources in the resource group 150.

The resource pool manager 140 can generate respective resource connection listener publishers for each requested resource connection sent by the client application 115. If the client application 115 specifies the acquire operation mode for some or all of the requested resource connections, then the resource pool manager 140 can generate corresponding acquire and release publishers for the client application 115 to subscribe to, accordingly. In those implementations, the generated reactive programming operators form multiple reactive programming operator orderings, with each ordering having a respective publisher.

For example, if the client application 115 sends requests to perform operations on both resource A 155A and resource N 155N, then the resource pool manager 140 can receive the requests and generate reactive programming publishers for each request, as described above. These reactive programming publishers can include first and second resource connection listener publishers that when executed establish a connection to resource A 155A and to resource N 155N, respectively.

The client application 115 can be one of many applications that requests a poolable object, e.g., a resource connection, from the reactive pooling manager 120. In implementations where the reactive pooling manager 120 receives requests for multiple poolable objects from one or more client applications, the resource pool manager 140 can generate a respective ordering of reactive programming operators, as discussed above, for each request.

For each reactive programming operator ordering, the thread manager 135 can allocate respective threads from the thread pool 145 to execute each reactive programming operator or publisher. As described above, the thread manager 135 can relinquish the computing resources for each respective thread before the resource pooling manager 140 can receive indications from the resource connection listener publishers in this example, indicating that resource connections satisfying the requests are available in the resource pool 145.

The client application 115 can invoke a function in the reactive programming API 125 that when executed is configured to execute a reactive pipeline of operators, e.g., the reactive operators discussed, above, in the borrow operation mode. The reactive pooling manager 120 can then provide any results from the requested operations, e.g., query results, to the requesting client application.

Table 1 is an example of source code in the client application for requesting a poolable object in the borrow operation mode:

TABLE 1

| 1 | Pool<Resource> pool; |
| 2 | Flux<String> words = pool.borrow(resource -> resource |
| 3 | .flatMap(r -> r.quoteOfTheDay( )) |
| 4 | .map(sentence -> sentence.split(" ")) |
| 5 | .flatMapIterable(Arrays::asList) |
| 6 | ); |
| 7 | words.subscribe(word -> |
| 8 | System.out.println(word)); |

Referring to table 1, on line 1 a new resource pool "pool" is declared. On line 2, a publisher named "words" is declared and the "borrow(•)" function is invoked to specify the borrow operation mode. The "borrow(•)" is configured to execute the reactive programming operators supplied as an argument to the function, from lines 4-7. In general, an operator or a pipeline of operators can be provided as an argument to the "borrow(•)" function, e.g., for executing a pipeline of operators on a resource. As discussed above, after the pipeline of operators is executed, the requested poolable object, e.g., a resource connection for the requested resource, is subsequently returned to the resource pool.

On lines 3-5, the "quoteOfTheDay(•)" function is invoked to return a sentence representing the quote of the day. Then, the quote is split by the "split(" ")" function, delimited by empty spaces, before being stored as an iterable array using the ".flatMapIterable(Arrays::asList)" function. Finally, on lines 7-8 the client application 115 subscribes to the "words" publisher and prints out a word representing the next word in the quote of the day.

The reactive pooling manager 120 can implement functionality associated with the acquire operation mode as defined functions in the reactive programming API 125. For example, the reactive programming API 125 can define wrapper functions that call one or more underlying functions in the reactive programming API that when executed, are configured to request and obtain a resource connection from the resource pool manager 140. The underlying functions can be functions defined for obtaining poolable objects in the borrow operation mode, except with the added parameters discussed above as arguments in the defined wrapper functions.

Alternatively the reactive programming API 125 can define entirely separate functions for obtaining poolable objects in the acquire operation mode. The reactive programming API 125 can also define functions for obtaining poolable objects in either the acquire or borrow operation mode, for example by including as an argument to the functions a flag indicating the operation mode.

Acquiring an available resource connection also allows the client application 115 to manage when the resource connection should be removed from the resource pool 145, based on different criteria. In some implementations, the resource pool manager 140 manages characteristics associated with each resource connection in the resource pool 145, which the client application 115 can use, for example, to reject a resource connection acquired from the resource pool manager 140. The resource pool manager 140 can also be configured to evaluate these characteristics to automatically invalidate an idle resource connection from the resource pool 145 if it sees one while obtaining or releasing a resource connection.

For example, the resource pool manager 140 can track and update the age of a resource connection. The client application 115 can specify a predetermined age threshold when sending requested operations to the reactive pooling manager 120 in the acquire operation mode. The resource pool manager 140 can determine that the requested operation mode was sent from the client application 115 in the acquire operation mode and can specify a predetermined age threshold.

Alternatively or in addition, the resource pool manager 140 can manage and update a borrow/acquire count for each resource connection, representing how many times the resource connection has been borrowed or acquired during the life time of the resource connection. The client application 115 can specify a predetermined borrow/acquire threshold when sending requested operations to the reactive pooling manager 120 in the acquire operation mode. The resource pool manager 140 can determine that the requested operation mode was sent from the client application 115 in the acquire operation mode that specifies a predetermined borrow/acquire threshold.

The client application 115 can specify whether a resource connection is returned to the resource pool after use. In some implementations, after the client application 115 releases the resource connection, the client application 115 can indicate to the resource pool manager 145 to remove the resource connection from the pool. The client application 115 may specify this, for example, because the age or borrow/acquire threshold has exceeded a predetermined threshold, and continued use of the resource connection will result in degraded performance.

In addition to resource connection invalidation on a case-by-case basis, the resource pool manager 140 can uniformly specify whether a resource connection is returned to the resource pool after use. In some implementations, the resource pool manager 140 can also encounter a resource connection n the resource pool 145 that has exceeded a predetermined age or borrow/acquire threshold, and choose to not provide the resource connection for use, and can additionally remove the encountered resource connection from the resource pool 145 altogether.

One distinction between the resource pool manager 140 removing a resource connection from the resource pool 145 in the borrow versus the acquire modes of operation, is that in the acquire operation mode, different client applications may specify additional age or borrow/acquire thresholds, whereas the resource pool manager 140 operating in the borrow mode will apply, if any, maximum age or borrow/acquire count on the resource connections uniformly.

Figure 2:
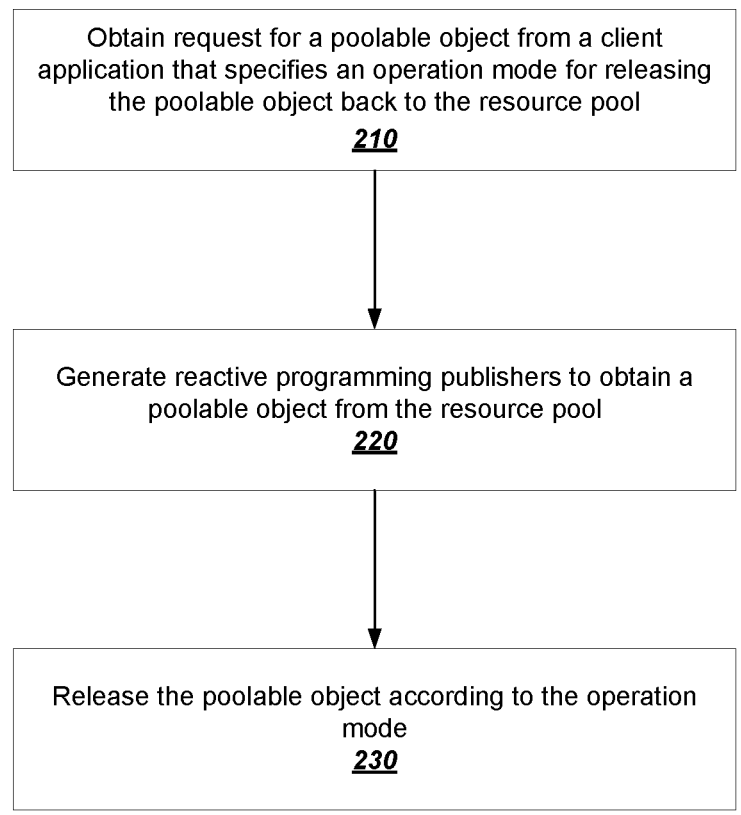
FIG. 2 is a flowchart for an example process for obtaining and releasing a poolable object in response to a request from a client application, using a reactive resource pooling system.

FIG. 2 is a flowchart for an example process for obtaining and releasing a poolable object in response to a request from a client application, using a reactive resource pooling system. For convenience, the process in FIG. 2 will be described as being performed by a system of one or more computers located in one or more locations. For example, a reactive resource pooling system, e.g., the reactive resource pooling system 100 of FIG. 1, appropriately programmed in accordance with this specification, can perform the process in FIG. 2. Additional detail for implementing a system that can perform the process in FIG. 2 can be found in the description of FIG. 1, above.

The system obtains a request for a poolable object from a client application that specifies an operation mode for releasing the poolable object back to the resource pool (210). As discussed above with respect to FIG. 1 and in general, the request can also include a request to execute operations on, for example, a requested resource, through a requested resource connection in the resource pool.

The system generates reactive programming publishers to obtain a poolable object from the resource pool (220). Regardless of the operation mode specified by the request, the system generates reactive programming publishers as discussed, above.

The system releases the poolable object according to the operation mode (230). As discussed above with reference to FIG. 1, if the request specified the borrow operation mode, then the system will automatically release the requested poolable object after the requested operations corresponding to the poolable object are executed. Alternatively, if the requested specified the acquire operation mode, the client application is ultimately responsible for releasing the poolable object. If the client application does not release the poolable object, the system can respond, for example, by raising an exception.

Figure 3A:
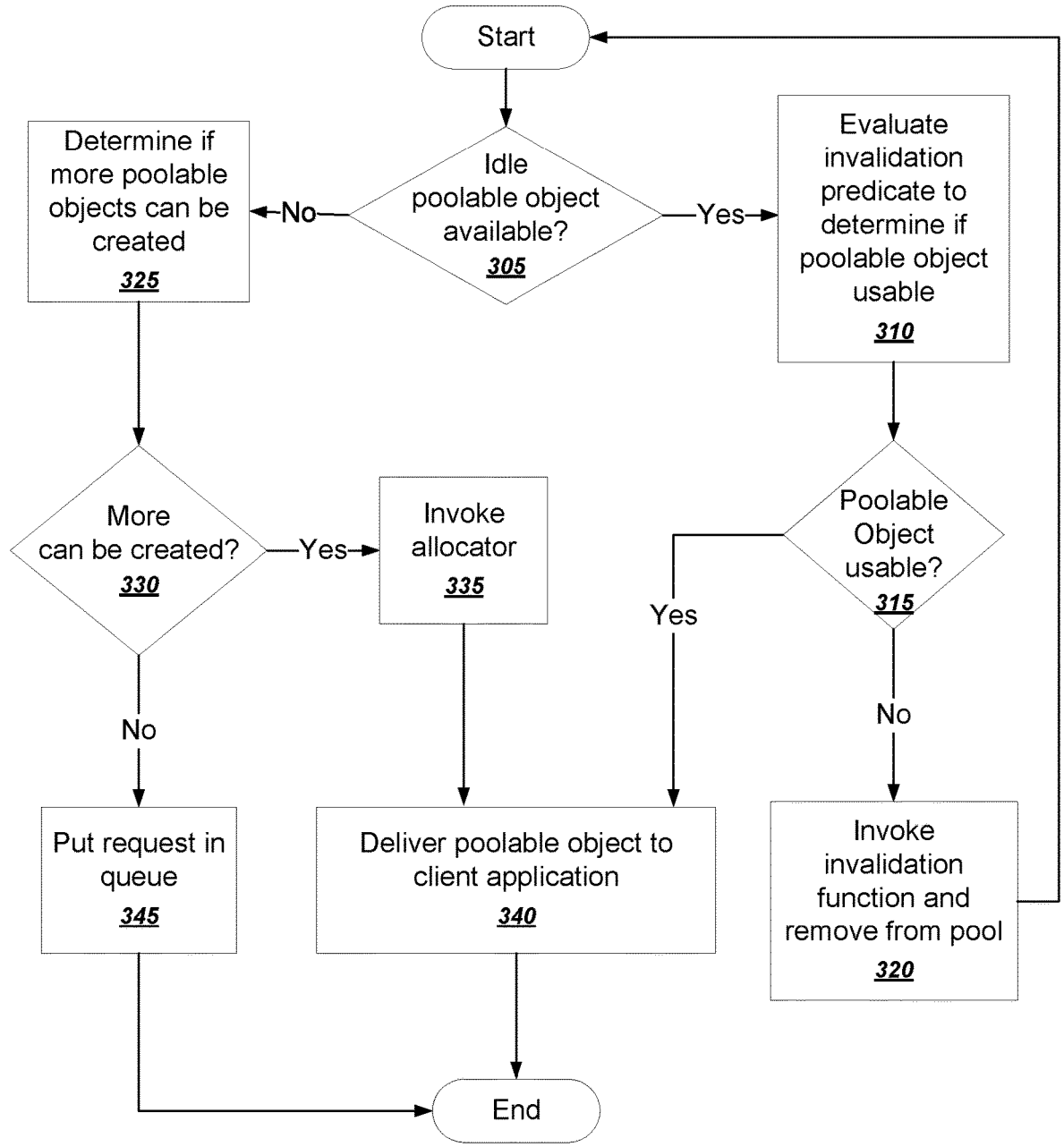
FIG. 3A is a flowchart for an example process for obtaining a poolable object from the resource pool.
Figure 3B:
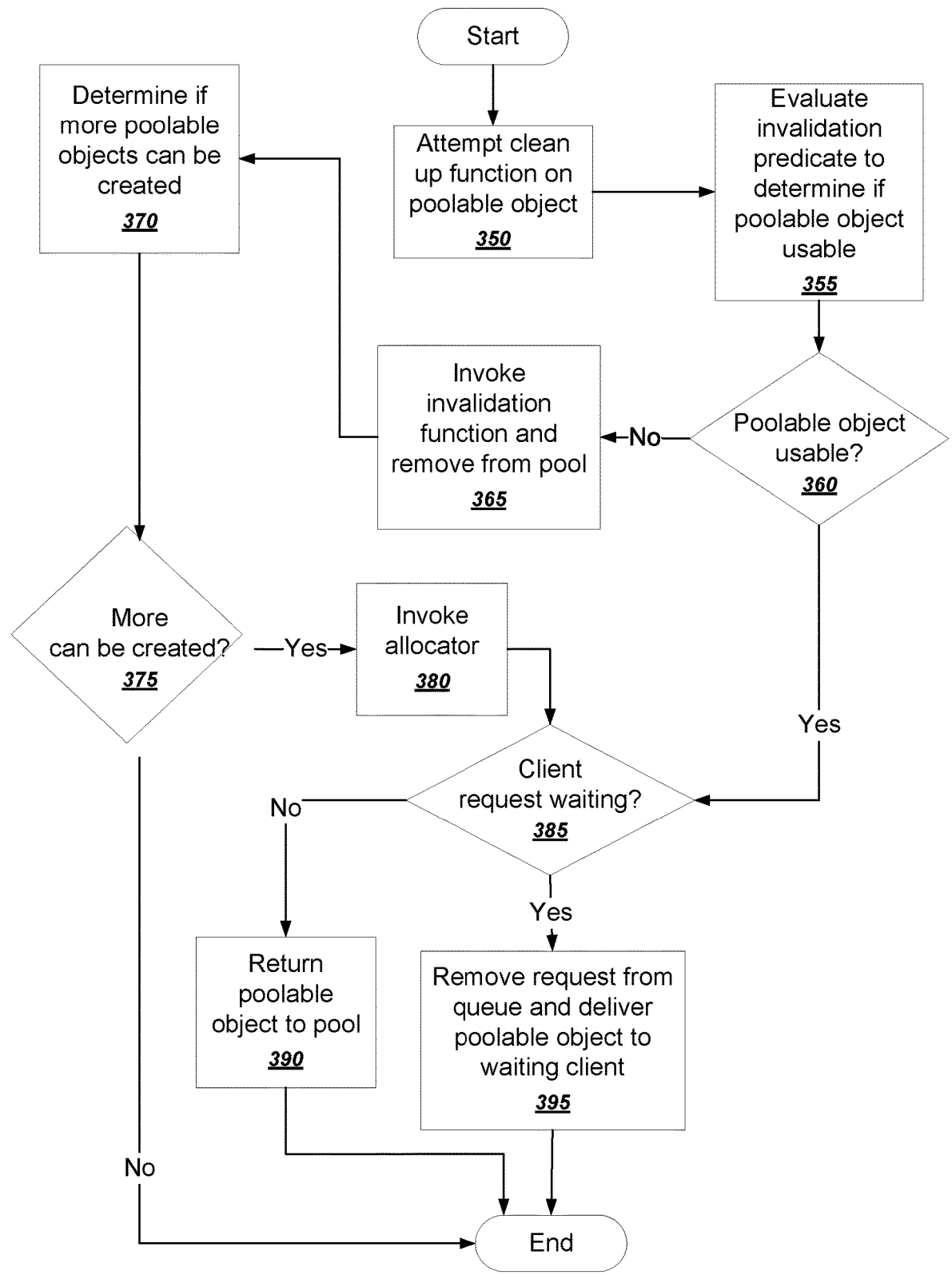
FIG. 3B is a flowchart for an example process for releasing a poolable object back into the resource pool.

FIGS. 3A-B are flowcharts for an example process for obtaining and releasing a poolable object, respectively. Regardless of the operation mode the client application issuing the request specifies, the system obtains and releases poolable objects by some process, for example as described below. Specific actions taken by the system can be configured differently on an implementation-to-implementation basis.

As with the example process shown in FIG. 2, for convenience, the processes in FIGS. 3A-B will be described as being performed by a system of one or more computers located in one or more locations. For example, a reactive resource pooling system, e.g., the reactive resource pooling system 100 of FIG. 1, appropriately programmed in accordance with this specification, can perform the processes in FIGS. 3A-B. Additional detail for implementing a system that can perform the processes in FIGS. 3A-B can be found in the description of FIG. 1 and FIG. 2, above.

FIG. 3A is a flowchart for an example process for obtaining a poolable object from the resource pool. The system begins the process for obtaining a poolable object in response to a request from a client application.

The system determines whether an idle poolable object in the resource pool is available (305). If the system determines that an idle poolable object in the resource pool is available, then the system evaluates an invalidation predicate to determine if the poolable object is usable (310). As discussed above in reference to FIG. 1, the system generally, and the client application in the acquire operation mode, can indicate conditions in which the system should invalidate a poolable object, instead of providing the poolable object to the client application in response to the request. The invalidation predicate can be based on statistics tracked by the system for each poolable object, such as the age of the object or the number of times it has been previously borrowed or acquired.

The system determines if the poolable object is usable, based on the invalidation predicate (315). If the system determines that the poolable object is not usable, then the system invokes an invalidation function to remove the poolable object from the resource pool (320), and restarts the process show in FIG. 3A to obtain an idle poolable object. If the system determines that a poolable object is available, then the system delivers the poolable object to the client application (340).

Returning to the decision branch at 305 in FIG. 3A, if the system determines that an idle poolable object is not available, then the system determines if more poolable objects can be added to the resource pool (325). The system may be able to add more poolable objects to the resource pool, for example, because other poolable objects have been invalidated. However, since the resource pool maintains a finite number of poolable objects, the system may determine that it cannot add more poolable objects, for example because the resource pool is currently at capacity.

The system determines whether more poolable objects can be created (330). If the system determines that more poolable objects can be created, then the system invokes an allocator configured to create a new poolable object (335). The newly created poolable object is then delivered to the client application, in response to the request (340).

If the system determines that more poolable objects cannot be created, then the system puts the request for the poolable object into a queue (345). As discussed above with reference to FIG. 1, the system through the resource pool manager is responsible for providing poolable objects in response to requests. The system queues and fulfills client application requests according to some order, which can be a chronological order or as a function of the priority of the different requests. As idle poolable objects become available, the resource pool manager can remove the next request in the queue and deliver available poolable objects to the requesting client application.

FIG. 3B is a flowchart for an example process for releasing a poolable object back into the resource pool. The system initiates the process for releasing a poolable object automatically in the borrow operation mode, after executing the provided reactive pipeline, as discussed above. If the system is operating in the acquire operation mode, the system initiates the process for releasing a poolable object in response to an explicit indication from the client application.

The system attempts a clean-up function on the poolable object (350). A clean up function is executed before a poolable object is returned to the resource pool, to first check if the poolable object should be returned, delivered to another client application in response to a request, or invalidated altogether.

As discussed above with respect to FIG. 3A, the system evaluates an invalidation predicate (355) and determines if a poolable object is usable (360).

If the system determines that the poolable object is usable, the system determines whether a client application request is waiting in the queue (385). If there is a queued request, the system pops the request off of the queue and delivers the poolable object to the client application that submitted the request (395). If the system determines that there are no queued client application requests, the system returns the poolable object to the resource pool (390).

If the system determines at 360 that the poolable object is no longer usable, the system invokes the invalidation function and removes the poolable object from the resource pool (365). Then, as discussed above with respect to FIG. 3A, the system determines if more poolable objects can be created (370), and if a new poolable object cannot be created, the process ends.

If the system can create a new poolable object, then the system invokes an allocator configured to create a new poolable object (380). Then, the system checks the queue to see if a client request is waiting (385). Depending on whether there is a client request in the queue, the system removes the request and delivers the newly created poolable object in response to the request (395); or if there is not a pending request, the system returns the newly created poolable object to the resource pool 390.

Next, a discussion of the reactive programming operator ordering and the upstream subscription ordering for the reactive programming operators is presented. As discussed above, a reactive pooling system can generate a plurality of reactive programming operators and publishers. The plurality of reactive programming operators defines an ordering of one or more operators, e.g., individual operators or operators, defining a pipeline, which the system can iterate over twice, once each in opposite directions. The operators in a pipeline can be represented as a graph, with a first and a last operator. Each edge in the graph indicates a one-way flow from a first operator to a second operator.

In some implementations, if a client application requests multiple resource connections to different resources, then the plurality of reactive programming operators can define multiple orderings, each corresponding to a respective resource. The explanation below details the reactive programming operator ordering for a single resource connection listener operator, but it is understood that the details below apply the same to multiple orderings.

An upstream ordering of the operators from a subscriber to a publisher represents a subscription flow through the operators for a particular subscriber. A downstream ordering of operators represents a data flow through the operators that propagates data from a particular publisher to a particular subscriber.

The publisher can be any of the reactive programming publishers described above, e.g., the resource connection listener publisher, the acquire publisher, or the release publisher. The subscriber for an ordering that consumes the final form of the data processed by the one or more operators is always defined in the client application. The reactive resource pooling system either provides the publisher, in the acquire operation mode; or a graph of one or more operators defining a processing pipeline received as input, along with a publisher, in the borrow operation mode. The system generally executes the upstream subscription flow first, followed by the downstream data flow.

Figure 4A:
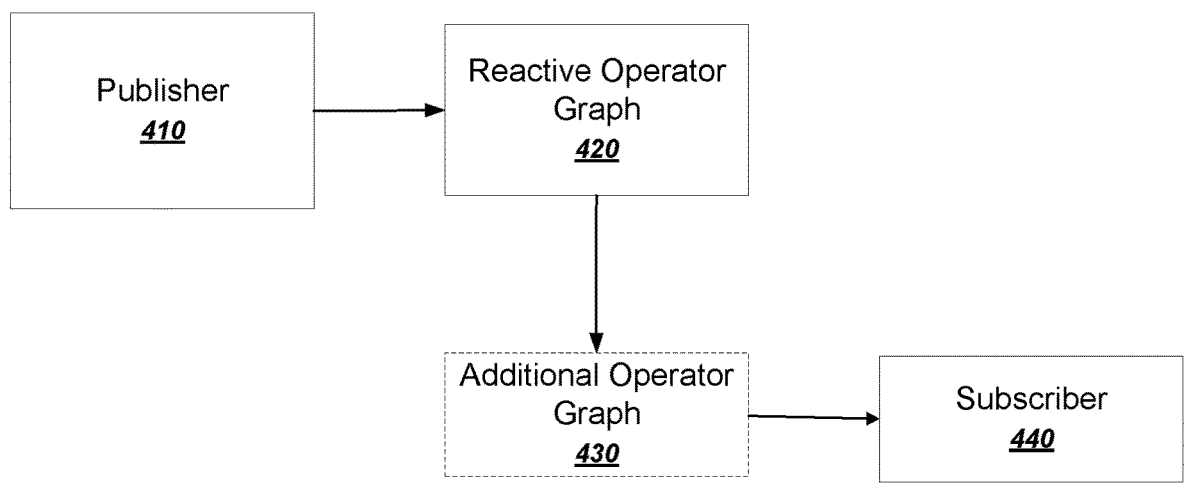
FIG. 4A is a diagram that illustrates a reactive programming operator ordering.

FIG. 4A is a diagram that illustrates an ordering of reactive programming operators. The ordering shown in FIG. 4A can be defined by the reactive resource pooling system, but generally follows a sequential order of operators needed to obtain a resource connection for the ordering of operators, and process data obtained using the resource connection.

Specifically, a publisher 410, e.g., a resource connection listener publisher, is ordered before a reactive operator pipeline 425, comprising one or more reactive programming operators that rely on a requested resource connection to operate successfully. The reactive resource pooling system operates in the borrow operation mode, the reactive operator pipeline 425 is provided to the resource pool manager of the reactive resource pooling system, executing the pipeline.

When the reactive operator pipeline 425 finishes executing, the resource pool manager can release the resource connection automatically, in the borrow operation mode. If the resource connection were to be released before the reactive operator pipeline 425 finishes executing, the pipeline would fail. If the resource pool manager is operating in the acquire operation mode, the client application is required to release the resource connection at some point after the reactive operator pipeline 425 finishes executing.

An optional, additional operator pipeline 430 can be ordered after the reactive operator pipeline 425. The operators in the additional operator pipeline 430 do not rely on the resource connection to execute successfully. The client application processes the additional operator pipeline 430.

If the client application is operating in the borrow operation mode, then by the time the additional operator pipeline 430 is processed, the resource connection used to process the reactive operator pipeline 425 has already been released by the resource pool manager. If the client application is operating in the acquire operation mode, then the client application can release the resource connection while executing the additional operator pipeline 430.

Lastly, a subscriber 440 is ordered after the additional operator pipeline 440 if one exists, otherwise the subscriber 440 is ordered after the reactive operator pipeline 420.

The resource connection listener operator 410, when executed by the system, can indicate to the resource pool manager when a resource connection is available in the resource pool. The resource connection listener operator 410 only begins to emit data after receiving a subscription request from a subscriber. The subscription operator 440 defines the subscriber for the resource connection listener operator 410. The subscription operator 440 starts the entire upstream subscription process and defines a receiving operator for the downstream data flow process.

Figure 4B:
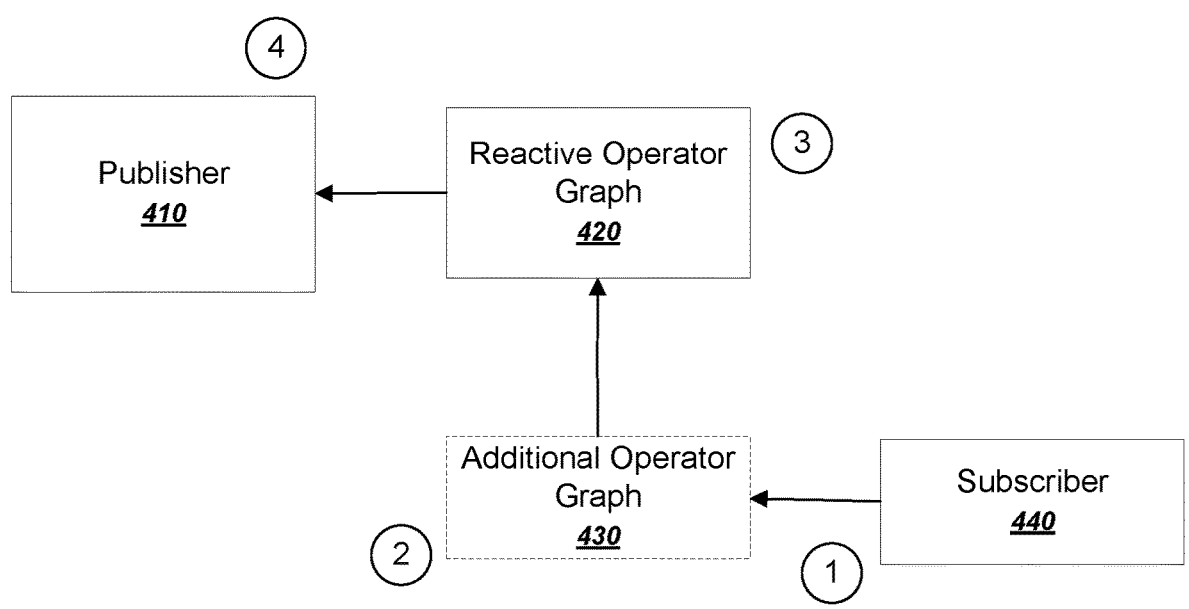
FIG. 4B is a diagram that illustrates the upstream subscription flow of a reactive programming ordering.

FIG. 4B is a diagram that illustrates the upstream subscription flow of a reactive programming operator ordering. The system evaluates the reactive programming operators in the upstream subscription flow ordering, beginning with the subscriber 440. The resource pool manager can evaluate the ordering for each reactive programming operator in the upstream subscription flow until the publisher 410 is evaluated.

The system follows the upstream ordering to perform a subscription operation for each operator in the upstream subscription flow.

Thus, the system can perform the following subscription operations in the upstream ordering. The system subscribes the operators in the additional operator pipeline 430, if any, are subscribed to in reverse order of the pipeline. The first operator in the additional operator pipeline 330 is subscribed to the last operator in the reactive operator pipeline 420. The operators in the reactive operator pipeline 420 are subscribed to in reverse order of the pipeline. The first operator in the reactive operator pipeline 420 is subscribed to the publisher 410.

Figure 4C:
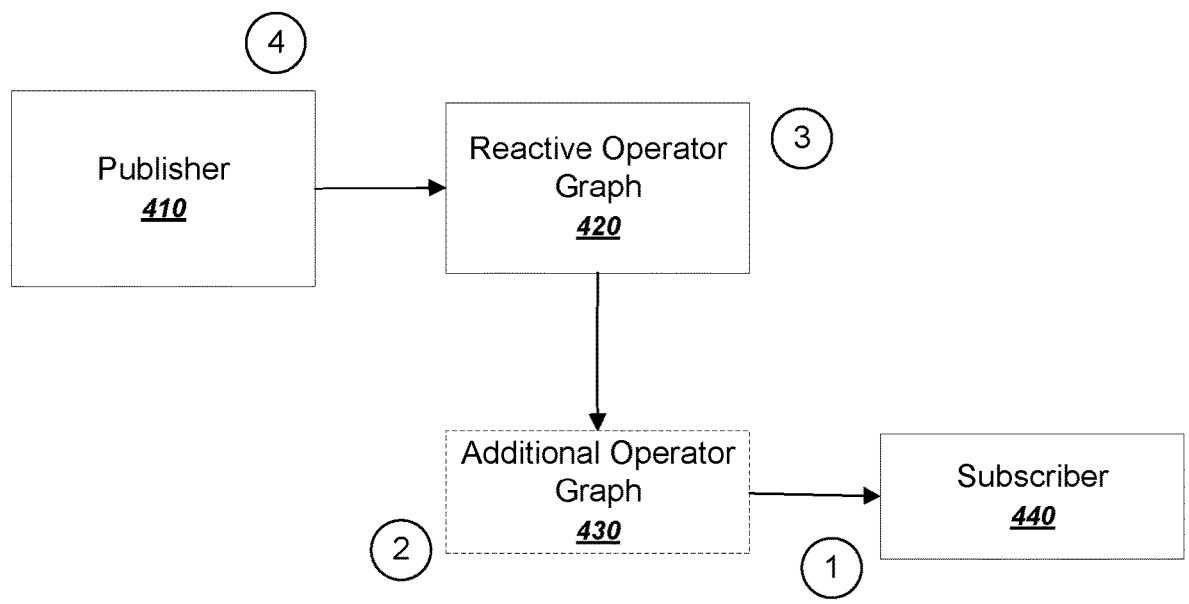
FIG. 4C illustrates the downstream data flow of a reactive programming ordering.

FIG. 4C illustrates the downstream data flow of a reactive programming ordering. The system first executes the resource connection listener operator 410, which begins to emit one or more data items indicating when a resource connection is available. The system then executes the resource connection operator to establish a connection to the resource. The system then executes the operator A 430A, followed by any operators between the operator A 430A and the operator N 430N, followed by the operator N 430N. As described above, because reactive programming is non-blocking, different threads of the underlying computing system can execute different respective operators.

Finally, the system provides any processed data items obtained by executing the reactive operator pipeline 420 and the additional operator pipeline 430 to the subscriber 440.

Because of the upstream and downstream flows that are part of the reactive programming paradigm, in addition to being non-blocking, the system can also manage how much data is received from a data source, such as from a resource. For example, a reactive operator configured to process data obtained from a resource connection by a resource connection publisher, can send indications to the resource connection publisher during the downward data flow to temporarily cease providing data while the reactive operator catches up. In this way, the system can allocate computing resources elsewhere temporarily, instead of continuing to provide data to an operator, when the data is very likely to sit in a backlog.

In some implementations, if the poolable object is a block of data slated for processing, the same principle can apply to a poolable object listener operator listening for the next available block of data. Reactive operators configured to process emitted data from the poolable object listener operator can send indications to the poolable object listener operator to pause or resume emitting data, depending on how backed up the reactive operator is.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments of the attached claims and the embodiments described above, the following numbered embodiments are also innovative:

Embodiment 1 is a system comprising: one or more computers, and one or more storage devices storing instructions that are operable, when executed by the one or more computers, to cause the one or more computers to perform operations comprising: receiving a first request, from a client application, for a poolable object in a resource pool comprising one or more poolable objects and maintained by a resource pool manager, wherein the request indicates an operation mode specifying how the resource pool manager should release the poolable object back into the resource pool; generating a plurality of reactive programming operators comprising a poolable object listener publisher that when executed is configured to indicate whether a poolable object in the resource pool is available and a subscriber that is configured to subscribe to the poolable object listener publisher, wherein the plurality of reactive programming operators define an upstream subscription flow ordering from the subscriber to the poolable object listener publisher, and a downstream data flow ordering from the poolable object listener publisher to the subscriber; evaluating the reactive programming operators in the upstream subscription flow ordering to obtain a poolable object from the resource pool; and releasing the poolable object back to the resource pool according to the operation mode of the request.

Embodiment 2 is the system of embodiment 1, wherein the operations further comprise: allocating a first thread to execute the poolable object listener publisher; and executing the poolable object listener publisher, using the first thread, to provide to the resource pooling manager an indication of the availability of the poolable object.

Embodiment 3 is the system of embodiment 2, wherein the operations further comprise: relinquishing computing resources for the first thread before providing to the resource pooling manager the indication of the availability of the poolable object; receiving, from the resource pooling manager, an indication that a poolable object is available; and in response, allocating a second thread to obtain the poolable object.

Embodiment 4 is the system of any one of embodiments 1-3, wherein the operations further comprise: obtaining, by the resource pool manager, the next available poolable object in the resource pool; and providing the poolable object, to the client application.

Embodiment 5 is the system of any one of embodiments 1-4, wherein the first request (i) is a request for a resource connection to a first resource in a plurality of resources, (ii) comprises a processing pipeline of one or more requested operations to execute on data at the first resource, and (iii) specifies a borrow operation mode; and the operations further comprising: obtaining, by the resource pool manager, a first resource connection to the first resource; executing the processing pipeline on the data at the first resource; and then, releasing, by the resource pool manager, the first resource connection.

Embodiment 6 is the system of any one of embodiments 1-5, wherein the operations further comprise: determining that an acquire operation mode is specified in the first request, and in response: executing the first request in the acquire operation mode, comprising identifying one or more acquisition parameters in the first request, wherein the one or more acquisition parameters specify conditions for releasing the poolable object.

Embodiment 7 is the system of any one of embodiments 1-6, wherein the one or more acquisition parameters include an age threshold, and the operations further comprising: obtaining an age of an available poolable object in the resource pool, wherein the age of the available poolable object is the time the available poolable object has been in the resource pool; determining that the age of the available poolable object is greater than the age threshold; and in response, removing the available poolable object from the resource pool.

Embodiment 8 is the system of any one of embodiments 6-7, wherein the one or more acquisition parameters include a borrow/acquire threshold, the operations further comprising: obtaining an borrow/acquire count for an available poolable object in the resource pool, wherein the borrow/acquire count for the available poolable object is the total number of times the available poolable object has been acquired or borrowed; determining that the borrow/acquire count for the available poolable object of the poolable object is greater than the borrow/acquire threshold; and in response, removing the available poolable object from the resource pool.

Embodiment 9 is the system of any one of embodiments 1-8, wherein the operations further comprise determining that a borrow operation mode is specified in the first request, and in response, executing the first request in the borrow operation mode.

Embodiment 10 is the system of embodiment 9 wherein the one or more predetermined conditions includes an age threshold, and the operations further comprising: obtaining an age of an available poolable object in the resource pool, wherein the age of the available poolable object is the time the available poolable object has been in the resource pool; determining that the age of the available poolable object is greater than the age threshold; and in response, removing the available poolable object from the resource pool.

Embodiment 11 is the system of any one of embodiments 9-10, wherein the one or more predetermined conditions includes a borrow/acquire threshold, the operations further comprising: obtaining an borrow/acquire count for an available poolable object in the resource pool, wherein the borrow/acquire count for the available poolable object is the total number of times the available poolable object has been acquired or borrowed; determining that the borrow/acquire count for the available poolable object of the poolable object is greater than the borrow/acquire threshold; and in response, removing the available poolable object from the resource pool.

Embodiment 12 is the system of any one of embodiments 1-11, wherein the one or more poolable objects are subsets of a data structure storing data slated for processing by the client application.

Embodiment 13 is the system of any one of embodiments 1-12, wherein the one or more poolable objects are tokens, wherein each token corresponds to an available resource provided by the system.

Embodiment 14 is the system of any one of embodiments 1-13, wherein the one or more poolable objects are segments of available memory on the system.

Embodiment 15 is the system of any one of embodiments 1-14, wherein the resource pool comprises multiple resource connections to a respective resource in one or more resources.

Embodiment 16 is a method comprising performing the operations of any one of embodiments 1-15.

Embodiment 17 is a computer storage medium encoded with a computer program, the program comprising instructions that are operable, when executed by a data processing apparatus, to cause the data processing apparatus to perform the operations of any one of embodiments 1-15.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

The invention claimed is:

1. A system comprising:
one or more computers, and one or more storage devices storing instructions that are operable, when executed by the one or more computers, to cause the one or more computers to perform operations comprising:
receiving a first request, from a client application, for a poolable object in a resource pool comprising one or more poolable objects and maintained by a resource pool manager, wherein the first request indicates an operation mode specifying how the resource pool manager should release the poolable object back into the resource pool;
generating a plurality of reactive programming operators comprising a poolable object listener publisher that when executed is configured to indicate whether a poolable object in the resource pool is available and a subscription operator that is configured to subscribe to the poolable object listener publisher, wherein the plurality of reactive programming operators define an upstream subscription flow ordering from a subscriber to the poolable object listener publisher, and a downstream data flow ordering from the poolable object listener publisher to the subscriber;
evaluating the reactive programming operators in the upstream subscription flow ordering to obtain a poolable object from the resource pool; and
releasing the poolable object back to the resource pool according to the operation mode of the first request.

2. The system of claim 1, the operations further comprising:
allocating a first thread to execute the poolable object listener publisher; and
executing the poolable object listener publisher, using the first thread, to provide to the resource pooling manager an indication of the availability of the poolable object.

3. The system of claim 2, the operations further comprising:
relinquishing computing resources for the first thread before providing to the resource pooling manager the indication of the availability of the poolable object;
receiving, from the resource pooling manager, an indication that a poolable object is available; and
in response, allocating a second thread to obtain the poolable object.

4. The system of claim 1, the operations further comprising:
obtaining, by the resource pool manager, the next available poolable object in the resource pool; and
providing the poolable object, to the client application.

5. The system of claim 1, wherein the first request (i) is a request for a resource connection to a first resource in a plurality of resources, (ii) comprises a processing pipeline of one or more requested operations to execute on data at the first resource, and (iii) specifies a borrow operation mode; and
the operations further comprising:
obtaining, by the resource pool manager, a first resource connection to the first resource;
executing the processing pipeline on the data at the first resource; and then,
releasing, by the resource pool manager, the first resource connection.

6. The system of claim 1, the operations further comprising:
determining that an acquire operation mode is specified in the first request, and in response: executing the first request in the acquire operation mode, comprising identifying one or more acquisition parameters in the first request, wherein the one or more acquisition parameters specify conditions for releasing the poolable object.

7. The system of claim 6, wherein the one or more acquisition parameters include an age threshold, and the operations further comprising:
obtaining an age of an available poolable object in the resource pool, wherein the age of the available poolable object is the time the available poolable object has been in the resource pool;
determining that the age of the available poolable object is greater than the age threshold; and
in response, removing the available poolable object from the resource pool.

8. The system of claim 6, wherein the one or more acquisition parameters include a borrow/acquire threshold, the operations further comprising:
obtaining an borrow/acquire count for an available poolable object in the resource pool, wherein the borrow/acquire count for the available poolable object is the total number of times the available poolable object has been acquired or borrowed;
determining that the borrow/acquire count for the available poolable object of the poolable object is greater than the borrow/acquire threshold; and
in response, removing the available poolable object from the resource pool.

9. The system of claim 1, the operations further comprising:
determining that a borrow operation mode is specified in the first request, and in response, executing the first request in the borrow operation mode.

10. The system of claim 9, wherein the one or more predetermined conditions includes an age threshold, and the operations further comprising:
obtaining an age of an available poolable object in the resource pool, wherein the age of the available poolable object is the time the available poolable object has been in the resource pool;
determining that the age of the available poolable object is greater than the age threshold; and
in response, removing the available poolable object from the resource pool.

11. The system of claim 9, wherein the one or more predetermined conditions includes a borrow/acquire threshold, the operations further comprising:
- obtaining an borrow/acquire count for an available poolable object in the resource pool, wherein the borrow/acquire count for the available poolable object is the total number of times the available poolable object has been acquired or borrowed;
- determining that the borrow/acquire count for the available poolable object of the poolable object is greater than the borrow/acquire threshold; and
- in response, removing the available poolable object from the resource pool.

12. The system of claim 1, wherein the one or more poolable objects are subsets of a data structure storing data slated for processing by the client application.

13. The system of claim 1, wherein the one or more poolable objects are tokens, wherein each token corresponds to an available resource provided by the system.

14. The system of claim 1, wherein the one or more poolable objects are segments of available memory on the system.

15. The system of claim 1, wherein the resource pool comprises multiple resource connections to a respective resource in one or more resources.

16. A method comprising:
- receiving a first request, from a client application, for a poolable object in a resource pool comprising one or more poolable objects and maintained by a resource pool manager, wherein the first request indicates an operation mode specifying how the resource pool manager should release the poolable object back into the resource pool;
- generating a plurality of reactive programming operators comprising a poolable object listener publisher that when executed is configured to indicate whether a poolable object in the resource pool is available and a subscription operator that is configured to subscribe to the poolable object listener publisher, wherein the plurality of reactive programming operators define an upstream subscription flow ordering from a subscriber to the poolable object listener publisher, and a downstream data flow ordering from the poolable object listener publisher to the subscriber;
- evaluating the reactive programming operators in the upstream subscription flow ordering to obtain a poolable object from the resource pool; and
- releasing the poolable object back to the resource pool according to the operation mode of the first request.

17. The method of claim 16, further comprising:
- allocating a first thread to execute the poolable object listener publisher; and
- executing the poolable object listener publisher, using the first thread, to provide to the resource pooling manager an indication of the availability of the poolable object.

18. The method of claim 17, further comprising:
- relinquishing computing resources for the first thread before providing to the resource pooling manager the indication of the availability of the poolable object;
- receiving, from the resource pooling manager, an indication that a poolable object is available; and
- in response, allocating a second thread to obtain the poolable object.

19. The method of claim 16, further comprising:
- obtaining, by the resource pool manager, the next available poolable object in the resource pool; and
- providing the poolable object, to the client application.

20. One or more non-transitory computer storage media encoded with computer program instructions that when executed by one or more computers cause the one or more computers to perform operations comprising:
- receiving a first request, from a client application, for a poolable object in a resource pool comprising one or more poolable objects and maintained by a resource pool manager, wherein the first request indicates an operation mode specifying how the resource pool manager should release the poolable object back into the resource pool;
- generating a plurality of reactive programming operators comprising a poolable object listener publisher that when executed is configured to indicate whether a poolable object in the resource pool is available and a subscription operator that is configured to subscribe to the poolable object listener publisher, wherein the plurality of reactive programming operators define an upstream subscription flow ordering from a subscriber to the poolable object listener publisher, and a downstream data flow ordering from the poolable object listener publisher to the subscriber;
- evaluating the reactive programming operators in the upstream subscription flow ordering to obtain a poolable object from the resource pool; and
- releasing the poolable object back to the resource pool according to the operation mode of the first request.

* * * * *